May 8, 1956     A. A. ROSS     2,744,688
AUTOMATIC HEAT CONTROL SYSTEM WITH WARM-UP PERIOD
Filed June 23, 1955     3 Sheets-Sheet 3

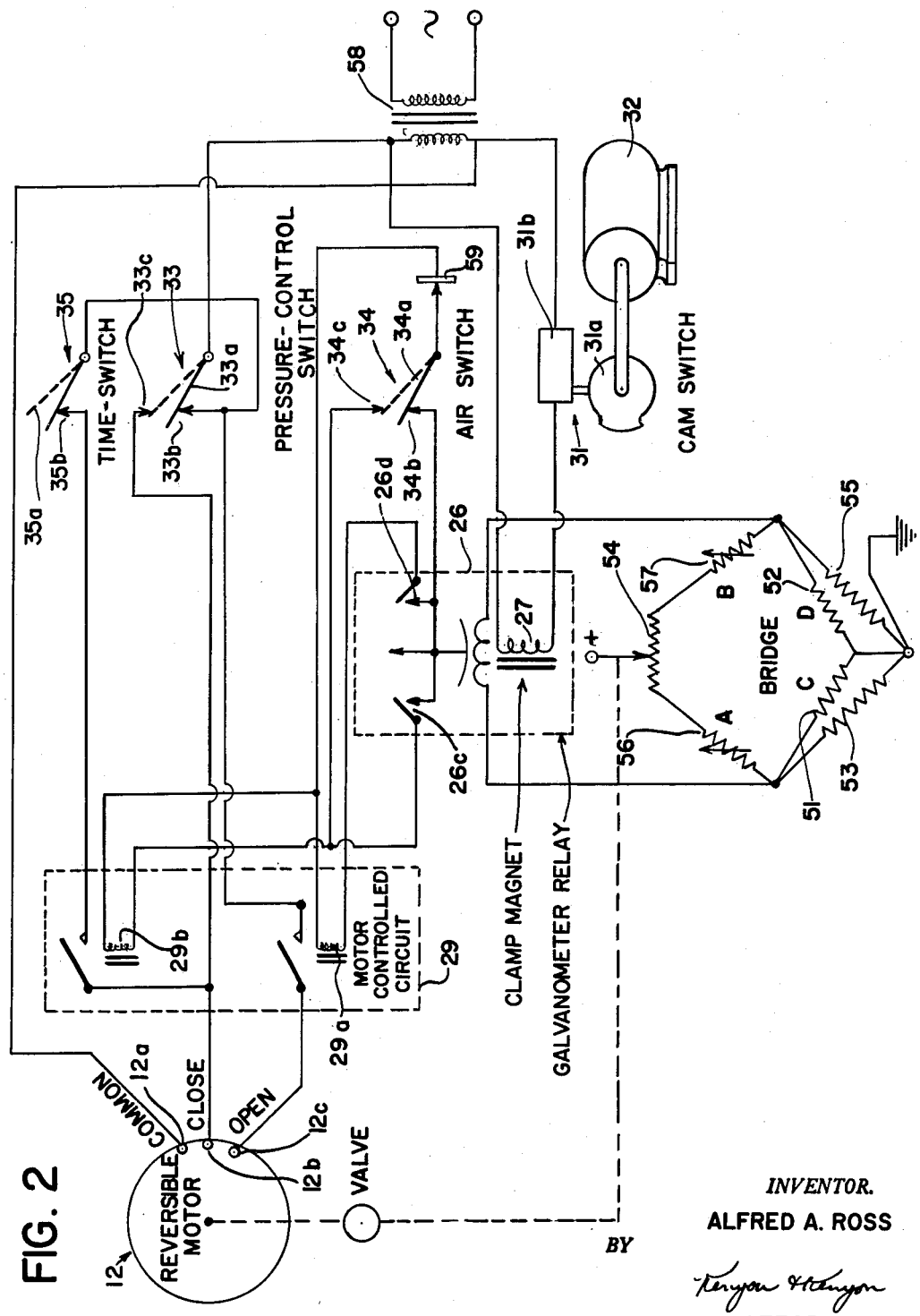

*INVENTOR.*
ALFRED A. ROSS
BY
*Kenyon & Kenyon*
ATTORNEYS

United States Patent Office 2,744,688
Patented May 8, 1956

2,744,688

AUTOMATIC HEAT CONTROL SYSTEM WITH WARM-UP PERIOD

Alfred A. Ross, Bayside, N. Y.

Application June 23, 1955, Serial No. 517,433

12 Claims. (Cl. 236—46)

This invention relates generally to apparatus for controlling the supply of heat in a building having a central heating system, and more particularly to apparatus which regulates the flow of heat in accordance with existing temperature conditions both inside and outside of the building and which is entirely automatic even to the extent of operating without manual intervention when shifting from a state of complete shut-down to one of full heat output.

One well known temperature control system makes use of a Wheatstone bridge circuit incorporating thermally-responsive resistors whose values depend respectively on the prevailing temperatures and the heat output of the system. The arrangement is such that the bridge is balanced or unbalanced as the prevailing temperatures and the heat output vary. Across the bridge there is connected a galvanometer relay which acts to detect the direction of unbalance. The relay in turn governs the setting of a motorized valve in the heat main.

Also included in the bridge circuit is a potentiometer whose contact arm is adjusted in proportion to the valve setting, the potentiometer thereby tending to re-establish the balance of the bridge as the valve setting is adjusted. Thus the heat control system seeks a condition of continuous balance between heat supply and heat demand, this condition of equilibrium being maintained until such time as a further change occurs.

The prevailing temperature is measured by a thermally-responsive resistor mounted on the interior surface of a window pane in the building, the resistance thereof reacting to prevailing outdoor weather variations as well as to air temperature changes within the building. A heat balancer is provided, constituted by a pair of temperature-sensitive resistors mounted above and below the heating elements of a convector unit, the resistors responding to a rise or fall in the temperature of the air stream passing through the convector unit. Thus the differential ohmic values of the resistors in the heat balancer are an index to the rate of heat output from the system. The original fixed adjustments of the bridge are such that it will be balanced in the event the heat output is sufficient to meet heat requirements, but if the heat output is inadequate, the bridge will become unbalanced.

When the bridge is unbalanced, the galvanometer relay cooperates with a periodically-activated control circuit to cause the motorized valve in the main to correct the heat output and at the same time to adjust the potentiometer so as to rebalance the bridge. The periodically-activated control circuit is cam-controlled and serves to regulate the steam supply in a stepwise manner in response to temperature changes inside and outside the heated area. A more comprehensive description of a prior art system of this general type may be found in the patent to Crosthwait, Jr., No. 2,451,790, issued December 2, 1947.

A heat control system as above-described will function in a satisfactory manner only as long as the heat supply is in uninterrupted operation. However, in actual practice, the boiler in many installations is shut down at night and must be refired in the morning. Under these circumstances the automatic system as above-described cannot be permitted to operate automatically during the warm-up period, for the sudden transition from zero heat to a predetermined heat level brings about a full opening of the main valve in a relatively short time. This abrupt change gives rise to water hammering and other effects which are highly objectionable. Consequently, it becomes necessary during the warm-up period manually to open the valve at a gradual rate for a period of from one half to one hour until sufficient pressure is developed, at which point the automatic control system is permitted to take over. While this manual operation may not be a serious drawback in a single building installation, where there is a central heating plant for a large building project involving as many as 30 to 50 buildings, then the need manually to adjust the controls in each building involves substantial and costly expenditures of time and labor.

Another trouble arising with systems of the automatic type heretofore known is that if steam pressure is lost during the day, due for instance to a temporary boiler failure, all the valves will automatically open wide. Thus the operator is required to close the valves manually so that steam pressure can be built up again. Furthermore, if the outside temperature rises above a legally established minimum, which in certain municipalities such as New York city is 55° F., then the operator should be available to shut down the system and he must also be present to start the system slowly when the temperature drops below the statutory limit. Hence even though the system is allegedly automatic, the manual operating requirements are almost as great as would be the case with a non-automatic installation.

In view of the foregoing it is the principal object of the invention to provide a fully automatic heat control system which obviates the need for manual adjustment even when shifting from a state of shut-down to maximum steam pressure conditions. A significant advantage of the present invention is that if operators are required at all, it is only to make certain that the steam plant is in operation and for general maintenance purposes.

More specifically, an object of the invention is to provide an automatic heat control system wherein the valve setting is adjusted at a relatively slow rate when shifting from a shut-down to an operative condition, whereas the action of the heat balancer is held in abeyance during this warm-up period, whereby hammering and other undesirable effects are avoided.

Still another object of the invention is to provide an improved automatic heat control system including switching means responsive to the steam pressure in the system to shut the valve in the main upon a failure of pressure therein.

A further object of the invention is to provide a switching arrangement responsive to exterior temperature conditions to render the automatic system operative in accordance with statutory requirements.

Briefly stated, an automatic heat control system in accordance with the invention includes a Wheatstone bridge circuit incorporating selector and balancer resistors, which bridge is unbalanced by changes in heat output and prevailing temperatures to actuate a galvanometer relay adapted to control the operation of a motorized valve in the heat supply, the valve setting serving to adjust a potentiometer in the bridge circuit to reestablish the balance therein when the desired heat pressure is obtained. Provision is made to operate the motorized valve at a relatively slow rate in a step-by-step manner in a direction according to the polarity of bridge unbalance, the operation of the valve in the closing direction in response to the action of the balancer being suspended during the warm-up period for a predetermined interval. Means are also provided to effect closure of the valve when steam pressure is lost or when the outside temperature rises above a predetermined value.

For a better understanding of the invention as well as other objects and further features thereof, reference is had to the following detailed description thereof to be read in connection with the accompanying drawing wherein like components in the figures are identified by the same reference numerals.

In the drawing:

Figure 2 is a schematic circuit diagram of said system;

Figure 1:
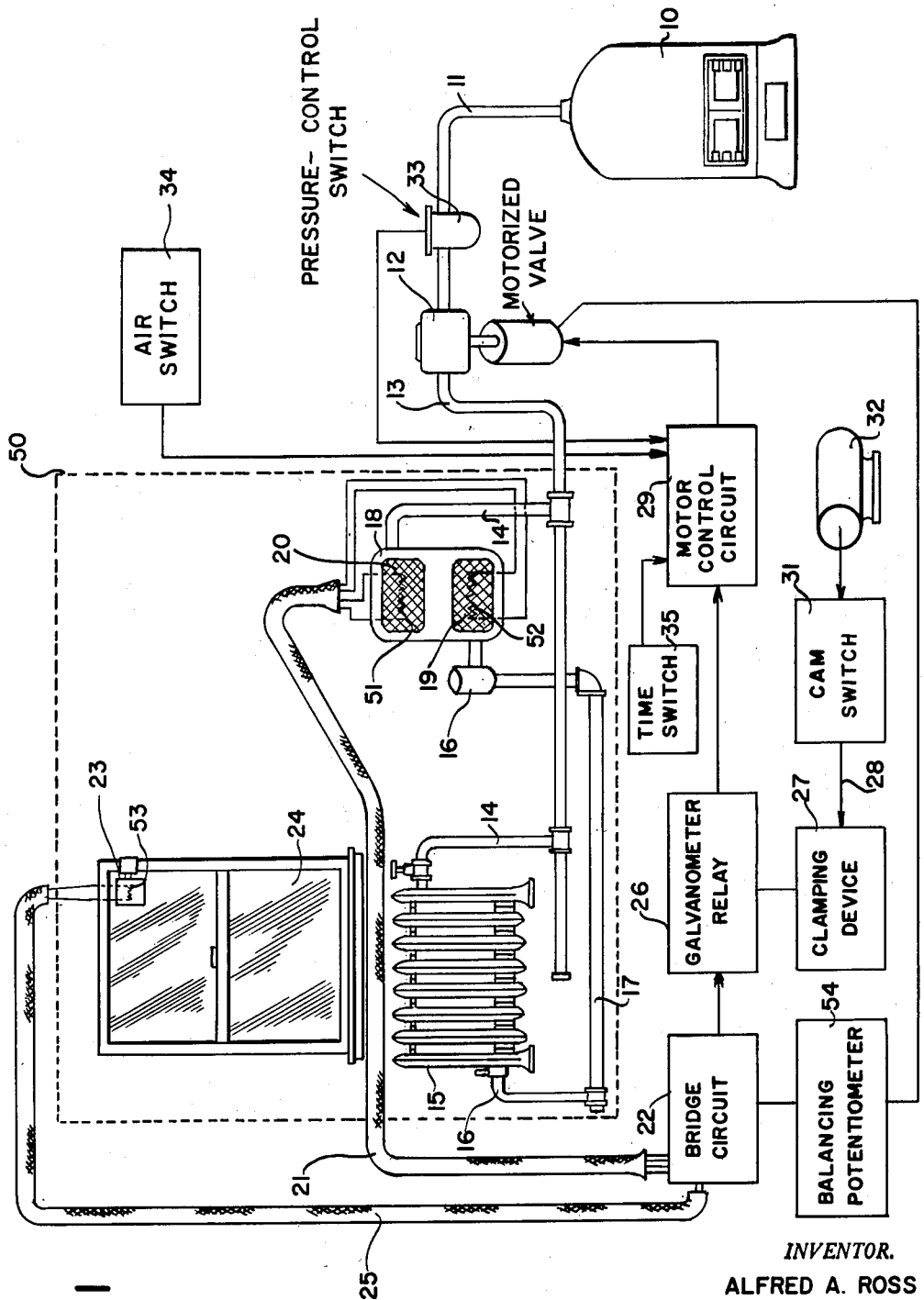
Figure 1 is a block diagram of an automatic heat control system in accordance with the invention.

Referring now to the drawings and more particularly to Figure 1, an automatic control heating system according to the invention comprises a boiler or heat generator 10 which supplies steam at a sufficiently high pressure to a main 11. Any available form of fuel may be used, such as gas, oil, etc. Interposed in the main is a motorized control or reducing valve 12 whose position is set automatically by the control system to establish a controlled flow of steam at a desired pressure through a supply main 13. Risers 14 are coupled to the supply main to feed steam to the individual radiators, such as radiator 15, located in the various rooms or sections of the building. The building is represented by the dash-line block 50. Radiators 15 are provided with the usual outlet traps through which condensate and air are drawn out through pipes 16 into a return main 17 leading back to an accumulator tank (not shown).

The heat output of the system is measured by a heat balancer 18 in the form of a small convector type radiating unit enclosed in a suitable casing through which air flows in at a lower grill 19 and is expelled through an upper grill 20. A pair of heat-sensitive resistors 51 and 52 are mounted within the casing above and below the convector unit and are connected by suitable conductors extending through a cable 21 to a Wheatstone bridge represented by block 22. Any difference in the temperatures to which the two resistors are subjected will cause a resistance change or unbalance in the bridge circuit.

The heat selector 23 is adapted to react directly to the effect within the building of outside temperature and weather changes. The thermally-sensitive resistor 53 of selector 23 is housed within a casing supported in contact with the inner glass surface of a window 24. The selector is arranged to respond with relative rapidity to outside temperature changes as transmitted through the window and less quickly to inside temperature as determined by the heat output or supply in the building. Thus selector 23 measures the rate of heat lost as partially or wholly compensated for by the changing heat output from the radiators. The selector resistor 53 is connected through a cable 25 to the Wheatstone bridge 22.

In operation, a decrease in the prevailing temperature will bring about a corresponding change in the selector to unbalance the bridge in one direction, whereas an increase in heat output will bring about a corresponding change in the balancer to unbalance the bridge in the opposing direction. The original adjustment of the bridge is such that a state of equilibrium is attained when the heat output is balanced against the prevailing temperature to produce a predetermined level of heat within the building. The exact nature of the bridge connections will be explained more fully in conjunction with Figure 2. To move the selector out of engagement with the window as the window is opened or closed, yieldable holding means are provided therefor, such as are disclosed in Patent No. 2,346,560 to Crosthwait, Jr.

Connected across the output of bridge circuit 22 is a galvanometer relay 26 of any known design, the needle of the galvanometer being deflected in one direction or another as the polarity of the potential difference reverses depending upon the direction of bridge unbalance. When the bridge is balanced the needle occupies the null position. The galvanometer relay includes two contact switches and an electromagnetic clamping device 27 which when actuated serves to effect engagement between the contacts of one of the two switches, the selected switch depending on the direction of needle deflection at the instant the clamping device is energized.

When one of the two relay switches is closed, a voltage is applied through line 28 to a motor-control circuit 29 so as to cause the motorized valve 12 to open, whereas when the other switch is closed, a voltage is applied through line 30 to the motor-control circuit to cause the valve to open. The control of the motorized valve is not continuous but stepwise, this being accomplished by intermittently actuating the clamping device by means of a cam-operated switch 31 driven by a motor 32. The cam switch serves to apply periodic energizing pulses to the clamping device. The rate at which these pulses are applied will be discussed in connection with the schematic diagram of Figure 2.

The motorized valve 12 is mechanically ganged with a bridge balancing potentiometer 54 such that the movable contact position of the potentiometer is in proportion to the setting of the valve. When the proper balance is established between the heat output and the prevailing temperature then the adjusted position of the potentiometer will be such as to balance the bridge, whereby the galvanometer is caused to occupy its null position and the motorized valve is maintained at rest. This condition is held until such time as a change arises calling for a further adjustment of the valve.

Coupled to the steam main 11 is a differential pressure-responsive switch or pressure control switch 33 which is adapted to open at a given steam pressure, for example, at 7 lbs. and to close at a pre-set lower pressure, say 3 lbs. Pressure control switch 33 is connected to the motor-control circuit 29 so as to compel the motor to close the valve when the switch is closed and to permit the motor to open the valve when the switch is open. In the event, therefore, the boiler pressure is lost or cut off at any time, the valve 12 will be urged to shut and to remain shut until such time as the pressure rises above the pre-set amount (i. e. 7 lbs.), at which point the valve is permitted to open.

Also provided is an air switch 34 which includes a protective hood to shield it from snow and rain, the switch being mounted outside the building at a northern exposure where it will not be affected by the sun. The air switch 34, which may be in the form of a thermostatic or bimetallic device, is a temperature-responsive mechanism having a heat differential characteristic such that it will open, for example at 58°, at a temperature rise, and close at a temperature drop, for example at 55°. The air switch is connected to the motor-control circuit 29 so as to permit the motorized valve 12 to open when the temperature drops below 55° and to compel the valve to close when the temperature rises above 58°. Thus the air switch may be pre-set to comply with statutory minimum heat requirements.

A time-controlled switch 35 is provided which is so connected to the motor-control circuit that when the switch is closed and held closed for a predetermined interval by a suitable timing mechanism, the motor-control circuit is disabled only with respect to effecting closure of the valve. The time-controlled switch 35 is set into motion automatically when the boiler is fired and the steam pressure begins to rise. The switch serves to suspend the action of the balancer which otherwise tends to close the valve as the heat output increases.

The automatic operation takes place as follows: In the morning, after the boilers are fired and the pressure starts to rise, the contacts of the pressure control 33 remains closed until the pressure reaches 7 lbs. at which point the switch opens, permitting the valve 12 to open up in a step-by-step manner. The valve continues to open in response to the action of the heat selector. In the absence of the time-controlled switch 35, the balancer 18 in response to the rising heat output would tend to cause unbalance of the bridge in a direction effecting closure of the valve. However, the action of the time-switch 35 suspends such closure during the warm-up period, after which period the balancer action is restored to permit the valve to reduce to a proper setting. At night, when the boiler is shut down, the pressure drops, causing the valve to close.

As shown in Figure 2, the circuit of the automatic control system comprises Wheatstone bridge 22 which includes four arms or branches A, B, C and D. Connected within branch C is the thermally-responsive selector resistor 53 and in branch D is a fixed matching resistor 55. Connected in parallel with resistor 53 is the first balancer resistor 51, and in parallel with matching resistor 53 is the second balancer resistor 52. The balancing potentiometer 54 is divided between branches A and B, the point of division being constituted by the movable contact arm 54a. A source of voltage to energize the bridge is connected between the movable contact 54a and the opposing diagonal of the bridge. The coil 26a of the galvanometer relay 26 is connected across the output diagonals of the bridge.

When the bridge is properly balanced, such as by adjustment of the variable resistors 56 and 57 in branches A and B, respectively, no current will flow through the galvanometer coil 26a. The thermally-sensitive resistors 51 and 52 are of the same value, hence a difference in temperature to which the two resistors are subjected in the balancer 18 (Fig. 1) will cause an unbalance of the bridge in a direction depending on whether the heat output of the system is rising or falling. The bridge will also be thrown out of balance by a change in the value of selector resistor 53 in response to a change in the prevailing temperature. While for purposes of clarity a relatively simple bridge circuit is disclosed herein, more elaborate circuits, including compensators, may be employed, such as are disclosed in the patent to Crosthwait, Jr., et al. No. 2,431,790.

The flow of current in coil 26a will deflect the needle 26b in a direction depending on the direction of current flow. The galvanometer relay 26 is provided with a pair of contact switches 26c and 26d which are normally open. The clamping device 27 is constituted by an electromagnet which will close either switch 26c or 26d depending on the direction of needle deflection at the instant the clamping electromagnet is energized.

The energization of the electromagnetic clamping device 27 is effected periodically by means of the cam-switch 31 which is constituted by a cam 31a, operating in conjunction with a micro-switch 31b, the cam being driven by motor 32. When the micro-switch 31a is actuated by the cam, it applies to the electromagnet a voltage derived from the secondary of a power transformer 58 whose primary is connected to the power line. In a practical embodiment, the cam may be designed to give one operation of one to two seconds duration per minute. This rate is relatively slow, as compared to the conventional three times per minute for three second intervals in prior art systems. The significance of this slow rate will be later discussed.

The motorized valve 12 may be constituted by a pair of oppositely rotating motors or a single reversible motor having a "common" terminal 12, a "close" terminal 12b and an "open" terminal 12c, such that when an energizing voltage is applied between terminals 12a and 12b, the rotation is such as to shut the valve, whereas when the same voltage is applied between terminals 12a and 12c, the rotation is in the valve-opening direction. The speed of the motorized valve 12 is preferably such that it effects a one to two percent opening or closing of the valve per minute.

The pressure control switch 33 is provided with a movable contact 33a, a rest contact 33b and an active contact 33c. The air switch 34 is provided with a movable contact 34a, a rest contact 34b and an active contact 34c. The time switch 35 includes a movable contact 35a and an active contact 35b.

The motor-control circuit 29 includes direct-current relays 29a and 29b, having contact switches which when actuated upon energization of the respective relays apply the transformer voltage to the "open" and "close" terminals 12c and 12b, respectively. The energizing coil of relay 29a is connected at one end to the movable contact of galvanometer switch 26d and at the other end through a suitable rectifier 59 to the movable contact 34a of air switch 34. The fixed contacts of galvanometer relay switches 26c and 26d are both connected to the rest contact 34b of the air switch. The energizing coil of relay 29b is connected at one end to the movable contact of galvanometer switch 26c and also to the active contact 34c of the air switch. The other end of the coil of relay 29b is connected through rectifier 59 to the movable contact 34a of the air switch.

The common terminal 12a of the motor is connected directly to the lower end of the secondary of transformer 58, whereas the "close" terminal 12b is connected to the movable contact of the relay 29b, the fixed contact of which is connected to the active contact 35b of the time switch. The movable contact 35a of the time switch is connected to the rest contact 33b of the pressure control switch. The movable contact 33a of the pressure control switch is connected to the upper end of the secondary of transformer 58. The active contact 33c of the pressure control switch is connected to the "close" terminal 12b. The "open" terminal 12c of the motor is connected through the contact switch of relay 29a to the rest contact 33b of the pressure control switch.

The behavior of the system under changing conditions of heat output, steam pressure and prevailing temperature is as follows:

Let us first assume a normal operating condition wherein (a) the time switch 35 is operative and is therefore closed, as shown by the solid line in the drawing; (b) the air switch 34 is at the rest contact position as shown by the solid line in the drawing (due to an outside temperature below the set limit); (c) the pressure control switch 33 is at the rest contact position, as shown by the solid line (due to sufficient steam pressure in the main).

Under these circumstances, a drop in the prevailing temperature will affect the selector resistor 53, causing bridge unbalance and producing a needle deflection to the right. When the clamping device 27 is activated, galvanometer switch 26d will close, thereby completing the circuit to relay 29a and causing the motor to step-operate the valve to open same. This stepping action will continue at a rate determined by the cam-operated switch 31.

As the valve 12 continues to open in a stepwise manner, the heat output of the system rises and this begins to affect the balance resistors 51 and 52, until a point is reached at which the bridge is thrown into unbalance in the opposite direction, thereby closing switch 26c when the clamping device is actuated. The closure of switch 26c effects energization of relay 29b, causing the motor to operate the valve in the closing direction each time the clamping device is actuated.

The valve continues to close in a stepwise manner, while at the same time potentiometer 54 is adjusted accordingly, until a condition of balance is reached between the prevailing temperature and the heat output, at which stage the balance of the relay is reestablished and the motor is no longer operated.

Let us now assume that there is a failure of pressure in the system. This will cause the pressure control switch 33 to take the active position shown in dash-lines, thereby by-passing relays 29a and 29b and connecting the "close" terminal 12b directly to the transformer secondary to shut off the valve. However, as soon as the pressure rises to the pre-set level, the pressure control switch 33 is caused to re-assume the rest position, shown in solid lines, and the normal functioning of relays 29a and 29b is restored.

Let us now consider a situation in which the outside temperature rises above the statutory limit at which heat must be furnished. When this occurs, the air switch 74 will assume the active position, shown in dash-lines, thereby disconnecting the galvanometer relay 26 from the motor control circuit and applying the rectified voltage to relay 29b to cause closure of the motorized valve. The valve will be maintained in a closed condition until such time as the outside temperature falls below the statutory limit, at which point the air switch will reconnect the galvanometer relay with the control circuit. It is to be understood that the pressure control switch 33 may alternatively be connected in parallel with air switch 34.

Let us finally turn to the situation which in the prior art system necessitated manual control of the valve during the warm-up period to gradually bring up the pressure. In the present invention, when the boiler is fired in the morning, after having been shut down at night, the timing switch 35 is simultaneously set into motion whereby the switch is closed, as shown in dash-lines, for a predetermined interval, say one half hour. During this period the contact circuit of relay 29b going to the "close" terminal 12b is interrupted, hence the control circuit is disabled as far as the closure of the valve is concerned. The circuit is, however, free to cause opening of the valve, which opening will initially occur when the pressure is sufficient to operate the pressure control switch 33.

Figure 3:
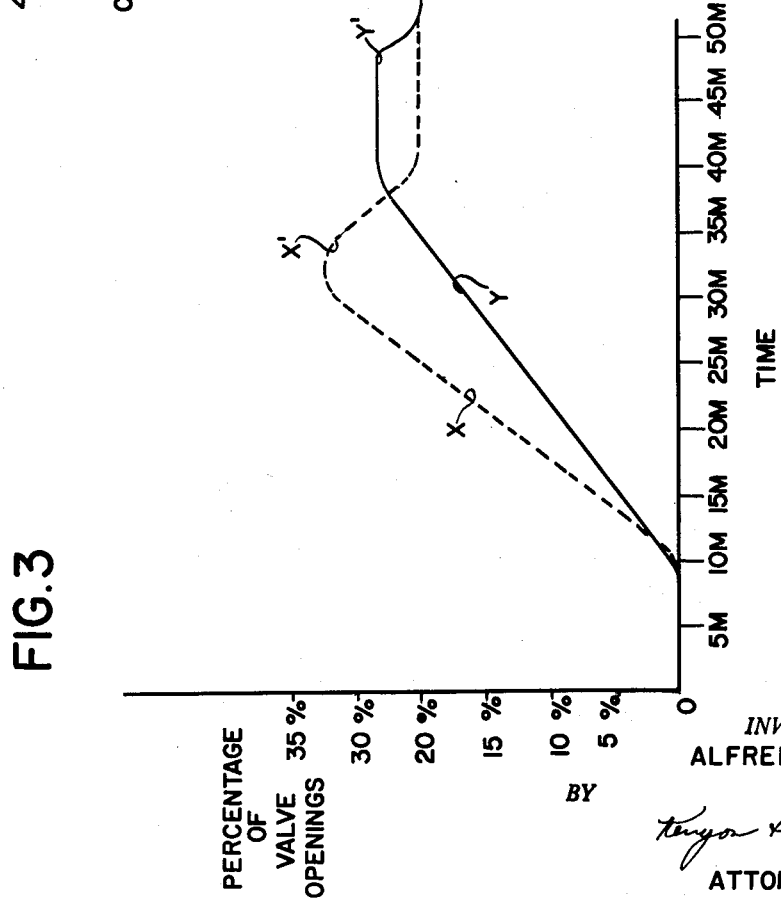
Figure 3 is a graph explanatory of the operation of the system.

The influence of the time-controlled switch on the operation of the system will be demonstrated in connection with Figure 3 by comparing the rate and direction of valve control in a prior art system with the rate and direction resulting from the present invention. In Figure 3, the percentage of valve opening is plotted against time. The curve X represents the course of valve movement in a prior art system lacking a time-controlled switch and wherein a cam-operated switch acts at a relatively rapid rate, for example, three times per minute for a three second period. The curve Y on the other hand represents the course of valve movement with the present system which includes the time switch and wherein the cam-operated switch 31 operates at a more gradual rate, say one operation per minute for a two second period.

Observing curve X, it will be seen that when the steam pressure is such as to bring about opening of the valve, it proceeds to open at a relatively steep rate. This is due to the unbalance between the prevailing temperatures, as measured by the selector resistor, and the heat output of the system, as measured by the balancer resistors, as well as the rapid cam action. Then as the heat output rises in response to this unbalance, this rise is reflected in the balancer resistors, and the valve is caused to move in the closing direction to seek the point of balance. Thus in curve X a hump X' appears indicating the point of inflection at which the influence of the increasing heat output on the balancer resistors brings about a closing movement of the valve. The valve continues to close until a balance is obtained between the prevailing temperatures and the heat output, at which point the remaining level portion of the curve indicates an equilibrium condition.

Now observing curve Y which represents the operation of the present invention, it will be seen that the rise of heat occurs at a somewhat slower rate about the normal settling point where it remains for a period terminating at point Y' determined by the setting of the time switch. Thereafter the normal control operation is resumed and the heat is adjusted accordingly. The explanation for this is that the operation of a time switch prevents closure of the valve, hence the heat output increases linearly until a morning pick-up level is reached, at which point the time switch continues to cut out the closing operation and the pick-up level is maintained until it reaches the end of the warm-up interval and the control system reverts to its normal manner of operation to establish the desired balance. The advantage of the present invention resides in the fact that water hammering and other undesirable effects, which attend an excessively steep increase in the valve opening when the pressure is first beginning to rise, are avoided during the warm-up period. There is no need, therefore, for manual control, as is the case with the conventional system.

Figure 4:
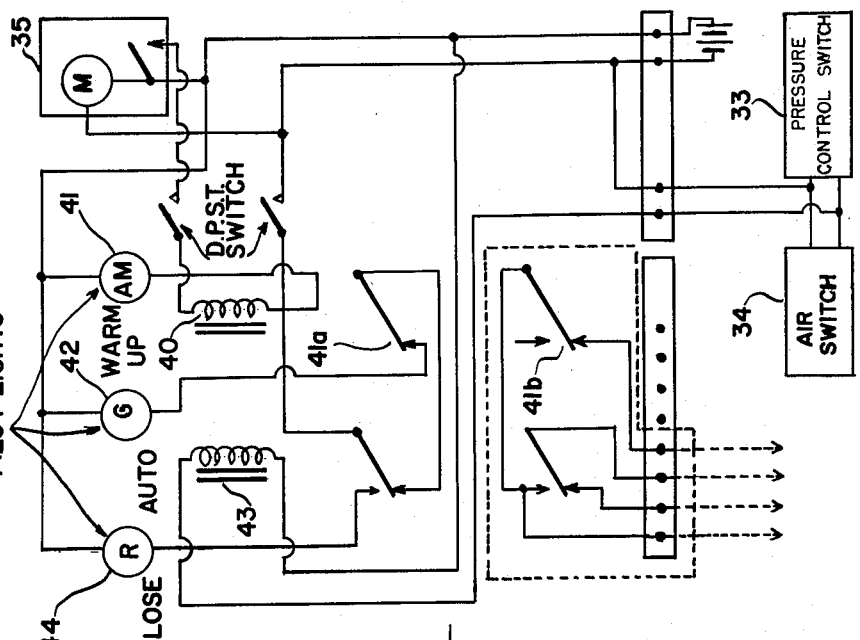
Figure 4 is the schematic diagram of a preferred panel arrangement for the automatic control system.

Referring now to Figure 4, the schematic diagram of a preferred form of panel arrangement for the time switch, the air switch and the pressure-control switch is illustrated, the various switches being connected to switching relays rather than directly into circuit. Where a large group of buildings is being serviced, a bank of such control panels, one for each building, may be set up at a central control station.

In Figure 4, the time switch 35, when closed, effects energization of a relay 40 having a pilot light 41 in series therewith whose color (amber) indicates the warm-up period when the relay is energized. The relay is provided with a first set of contacts 40a which when the relay 40 is de-energized serves to light up a second pilot light 42 having a color (green), indicating automatic operation. The relay 40 includes a second set of contacts 41b which are connected into the control circuit in a manner similar to that shown in Figure 2.

The air switch 34 and pressure control switch 33 are connected in parallel and when either one is closed it serves to energize a relay 43 having a first set of contacts 43a. When relay 43 is energized, contacts 43a serve to light up a third pilot light 44 whose color (red) indicates that the valve is closed, and when relay 43 is de-energized the contacts 43 act to light up the pilot 42. Relay 43 is provided with a second set of contacts 43b which serve to carry out the switching functions shown in Figure 2. Thus the condition of the system is always indicated.

While there has been shown what is considered to be a preferred embodiment of the invention, it will be evident that many changes and modifications may be made therein without departing from the essential spirit of the invention. Accordingly, it is intended in the claims appended hereto to cover all such changes and modifications as fall within the true spirit of the invention.

What is claimed is:

1. An automatic heat control system adapted to select the rate of heat output requisite to prevailing temperature conditions, said system comprising a balanced bridge circuit responsive to changes in prevailing temperature and to heat output of said system to upset the balance of said bridge in an appropriate direction indicative of such changes, a control circuit connected to said bridge and coupled to said mechanism for increasing or decreasing the valve opening in successive increments at a relatively slow rate according to the unbalanced condition of said bridge, and a time-controlled switch for disabling said control circuit with respect only to a decrease in said valve opening for a predetermined warm-up period.

2. An automatic heat control system adapted to select the rate of heat output requisite to prevailing temperature conditions, said system comprising a balanced bridge circuit responsive to changes in prevailing temperature and to heat output of said system to upset the balance of said bridge in an appropriate direction indicative of such changes, means connected to the output of said bridge to detect the direction of unbalance, a valve-operating mechanism, a control circuit responsive to said detection means and coupled to said mechanism for increasing or decreasing the valve opening according to the unbalanced condition of said bridge, periodic switching means to render said detection means intermittently operative to cause said increase or decrease of the valve opening to occur by successive increments at a relatively slow rate, and a time-controlled switch for disabling said control circuit with respect only to a decrease in said valve opening for a predetermined warm-up period.

3. An automatic heat control system adapted to select the rate of heat output requisite to prevailing temperature conditions, said system comprising a balanced bridge circuit including thermally-sensitive resistance elements responsive to changes in prevailing temperature and to the heat output of said system to upset the balance of said bridge in an appropriate direction indicative of such changes, a galvanometer relay connected to the output of said bridge, a valve-operating mechanism, a control circuit responsive to said relay and coupled to said mechanism for increasing or decreasing the valve opening according to the unbalanced condition of said bridge, periodic switching means to render said relay intermittently operative to cause said increase or decrease of the valve opening to occur by successive increments at a relatively slow rate, and a time-controlled switch for disabling said control circuit with respect only to a decrease in said valve opening for a predetermined warm-up period.

4. An automatic heat control system adapted to select the rate of heat output requisite to prevailing temperature conditions, said system comprising a balanced bridge circuit including thermally-sensitive resistance elements responsive to changes in prevailing temperature and to heat output of said system to upset the balance of said bridge in an appropriate direction indicative of such changes, a galvanometer relay connected to the output of said bridge, a valve-operating mechanism, a control circuit responsive to said relay and coupled to said mechanism for increasing or decreasing the valve opening according to the unbalanced condition of said bridge, periodic switching means to render said relay intermittently operative to cause said increase or decrease of the valve opening to occur by successive increments at a relatively slow rate, an air switch responsive to exterior temperature conditions and coupled to said control circuit to effect a decrease in said valve opening when said exterior temperature rises above a pre-set valve, whereby said valve is maintained shut until such time as the exterior temperature drops below said valve, and a time-controlled switch coupled to said control circuit to disable same with respect to a decrease in valve opening for a predetermined warm-up period.

5. An automatic heat control system adapted to select the rate of heat output requisite to prevailing temperature conditions, said system comprising a balanced bridge circuit including thermally-sensitive resistance elements responsive to changes in prevailing temperature and to heat output of said system to upset the balance of said bridge in an appropriate direction indicative of such changes, a galvanometer relay connected to the output of said bridge, a valve-operating mechanism, a control circuit responsive to said relay and coupled to said mechanism for increasing or decreasing the valve opening according to the unbalanced condition of said bridge, periodic switching means to render said relay intermittently operative to cause said increase or decrease of the valve opening to occur by successive increments at a relatively slow rate, an air switch responsive to exterior temperature conditions and coupled to said control circuit to effect a decrease in said valve opening when said exterior temperature rises above a pre-set value, whereby said valve is maintained shut until such time as the exterior temperature drops below said value, a time-controlled switch coupled to said control circuit to disable same with respect to a decrease in valve opening for a predetermined warm-up period, and a pressure-responsive switch coupled to said main and connected to said control circuit to cause said valve to close when pressure in said main falls below a predetermined value.

6. An automatically-operated heat control system adapted to select the rate of heat output requisite to prevailing temperature conditions, said system comprising a heat source, a main for connecting said source to suitable radiation means, a valve interposed in said main to control the heat output thereof, a valve-operating motor mechanism, a balanced bridge circuit including thermally-sensitive resistors responsive to changes in prevailing temperature and to heat output to upset the balance of said bridge in an appropriate direction indicative of such changes, a galvanometer relay connected to the output of said bridge, a control circuit responsive to said relay and coupled to said motor mechanism for increasing or decreasing the valve opening according to the unbalanced condition of said bridge, periodic switching means to render said relay intermittently operative to cause said increase or decrease of the valve opening to take place in successive increments at a relatively slow rate, and a time-controlled switch for disabling said control circuit only with respect to a decrease in said valve opening for a pre-determined warm-up period.

7. An automatically-operated heat control system adapted to select the rate of heat output requisite to prevailing temperature conditions, said system comprising a heat source, a main for connecting said source to suitable radiation means, a valve interposed in said main to control the heat output thereof, a valve-operating motor mechanism, a balanced bridge circuit including thermally-sensitive balancer and selector resistors responsive to changes in prevailing temperature and to heat output to upset the balance of said bridge in an appropriate direction indicative of such changes, a galvanometer relay connected to the output of said bridge, a control circuit responsive to said relay and coupled to said motor mechanism for increasing or decreasing the valve opening according to the unbalanced condition of said bridge, periodic switching means to render said relay intermittently operative to cause said increase or decrease of the valve opening to take place in successive increments at a relatively slow rate, a pressure-responsive switch coupled to said main and connected to said control circuit to shut said valve upon failure of pressure therein, and a time-controlled switch for disabling said control circuit only with respect to a decrease in said valve opening for a predetermined warm-up period.

8. A system as set forth in claim 7, wherein said pressure-responsive switch has a differential characteristic.

9. An automatically-operated heat control system adapted to select the rate of heat output for a building requisite to prevailing temperature conditions, said system comprising a boiler, a main connecting said boiler to radiator means, a heat balancer having a convector unit coupled to said main and including a pair of thermally-sensitive resistors mounted above and below said unit whereby said resistors provide a differential output, a selector mounted on the inner side of a window in said building and including a thermally-responsive resistance element which reacts to changes in prevailing temperature, a four-arm balanced bridge, said element being included in one arm of said bridge, one of said resistors being connected across said element, the other of said resistors being included in the adjacent arm of said bridge, a balancing potentiometer divided between the remaining arms of said bridge and having an adjustable tap which determines the point of division, means to apply an input voltage between said tap and the juncture of said first and second arms, said bridge being unbalanced by said element and said resistors in an appropriate direction indicative of said changes, a galvanometer relay having a coil connected between the output diagonals of said bridge, said galvanometer relay including an electromagnetic clamping device to render said relay operative in a direction depending on the direction of galvanometer movement at the instant said device is energized, cam-operated switch means coupled to said clamping device to energize said device periodically at a relatively slow rate, a valve interposed in said main to control the heat output thereof, a valve-operating motor mechanism, a control circuit for said mechanism responsive to said periodically-activated relay for increasing or decreasing in successive increments the valve opening according to the unbalanced condition of said bridge, and a time-controlled switch for disabling said control circuit for a pre-determined warm-up period with respect only to the decrease in valve opening.

10. A system, as set forth in claim 9, further including an air switch mounted at the exterior of said building and so connected to said motor control circuit as to shut said valve when the temperature rises above a predetermined level.

11. A system, as set forth in claim 10, further including a differential pressure control switch coupled to said main and so connected to said control circuit as to shut said valve upon failure of pressure in said main.

12. A system, as set forth in claim 11, wherein said cam switch has a switching rate of about one operation per minute for a two second interval.

References Cited in the file of this patent

UNITED STATES PATENTS 2,362,977     Crosthwait et al. _____ Nov. 21, 1944